July 22, 1947.                W. H. SILVER                2,424,372
                    INTEGRALLY MOUNTED LISTER OR BEDDER
                    Filed Sept. 23, 1943        7 Sheets-Sheet 1

INVENTOR
WALTER H. SILVER

ATTORNEYS

FIG. 2

INVENTOR
WALTER H. SILVER
BY
ATTORNEYS

July 22, 1947. W. H. SILVER 2,424,372
INTEGRALLY MOUNTED LISTER OR BEDDER
Filed Sept. 23, 1943 7 Sheets-Sheet 4

FIG. 5

INVENTOR
WALTER H. SILVER
BY
ATTORNEYS

July 22, 1947. W. H. SILVER 2,424,372
INTEGRALLY MOUNTED LISTER OR BEDDER
Filed Sept. 23, 1943 7 Sheets-Sheet 5

INVENTOR
WALTER H. SILVER
BY
ATTORNEYS

FIG. 9

Patented July 22, 1947

2,424,372

UNITED STATES PATENT OFFICE 2,424,372

INTEGRALLY MOUNTED LISTER OR BEDDER

Walter H. Silver, Moline, Ill., assignor to Deere & Company, Moline, Ill., a corporation of Illinois Application September 23, 1943, Serial No. 503,579

23 Claims. (Cl. 97—47)

The present invention relates generally to agricultural implements and more particularly to implements of the type that is adapted to be mounted directly on a farm tractor. More particularly, the present invention relates to integral listers, bedders and the like.

The object and general nature of the present invention is the provision of an integral implement, such as a lister or bedder, having three furrow openers, the two laterally outer furrow openers being carried by the tractor forward of the rear wheels thereof, while the third or central tool is carried at the rear of the tractor. More particularly, it is a feature of this invention to provide improved means for gauging the depth of operation of the several tools and for raising and lowering them into and out of their transport and working positions. Specifically, it is a feature of this invention to provide a new and improved mounting for the front tools, incorporating separately swingable push bars or beams, pivotally connected for independent movement with the rear end of the tractor and extending forwardly alongside the sides of the tractor to receive the front tools at the front ends of the beams. Further, it is a feature of this invention to provide gauge means for the front tools, which gauge means is disposed so as to be swingable with the push bars and therefore more effective as a gauging medium.

A further feature of this invention is the provision of an integral implement incorporating a rear central tool carried by the tractor and connected therewith through a laterally swingable connection, in conjunction with new and improved gauge means which incorporates a pair of laterally spaced gauge wheels operating in the furrows or trenches formed by the front tools, whereby depth adjustment for all three tools may be effected by changing the depth adjustment for only the front tools.

Another feature of this invention is the provision of a parallel link connection for the rear central tool, whereby to secure the advantages of a short coupled arrangement, together with the advantages of a tool mounting the equivalent of a long beam. It is a further feature of this invention to provide for means limiting the lateral swinging of the rear tool when the latter is raised into its transport position.

Another feature of this invention is the provision of a new and improved gauge wheel mounting for the front tools whereby the gauge wheels are disposed substantially in a position lying in a line passing through the front tool and the point of pivotal connection of the push beam to which the tool is connected. This provides an arrangement in which there is no tendency for the tool to be angularly displaced, in either one direction or the other, laterally. Further, another feature of this invention is the provision of a new and improved mounting for the coulters of the front tools.

Still further, another feature of this invention is the provision of new and improved means accommodating the independent swinging of the push bars but connecting the front ends of the latter with the tractor so as to restrain them against lateral displacement. Specifically, it is a feature of this invention to provide a two-part vertically swingable anchoring hitch and a cross bar connecting the anchoring hitch with the front ends of the tools.

An additional feature of this invention is the provision of means unconnected with the tractor for adjusting the position of the gauge wheels for the front tools but in which such adjusting means is readily accessible to the operator of the tractor. This materially simplifies the mounting of the implement and the dismounting of the implement on and from the tractor.

These and other objects and advantages of the present invention will be apparent to those skilled in the art after a consideration of the following detailed description, taken in conjunction with the accompanying drawings in which the preferred embodiments of the invention have been illustrated.

In the drawings:

Figure 1 is a plan view.

Figure 3 is an enlarged fragmentary view taken along the line 3—3 of Figure 1.

Figures 1, 3:
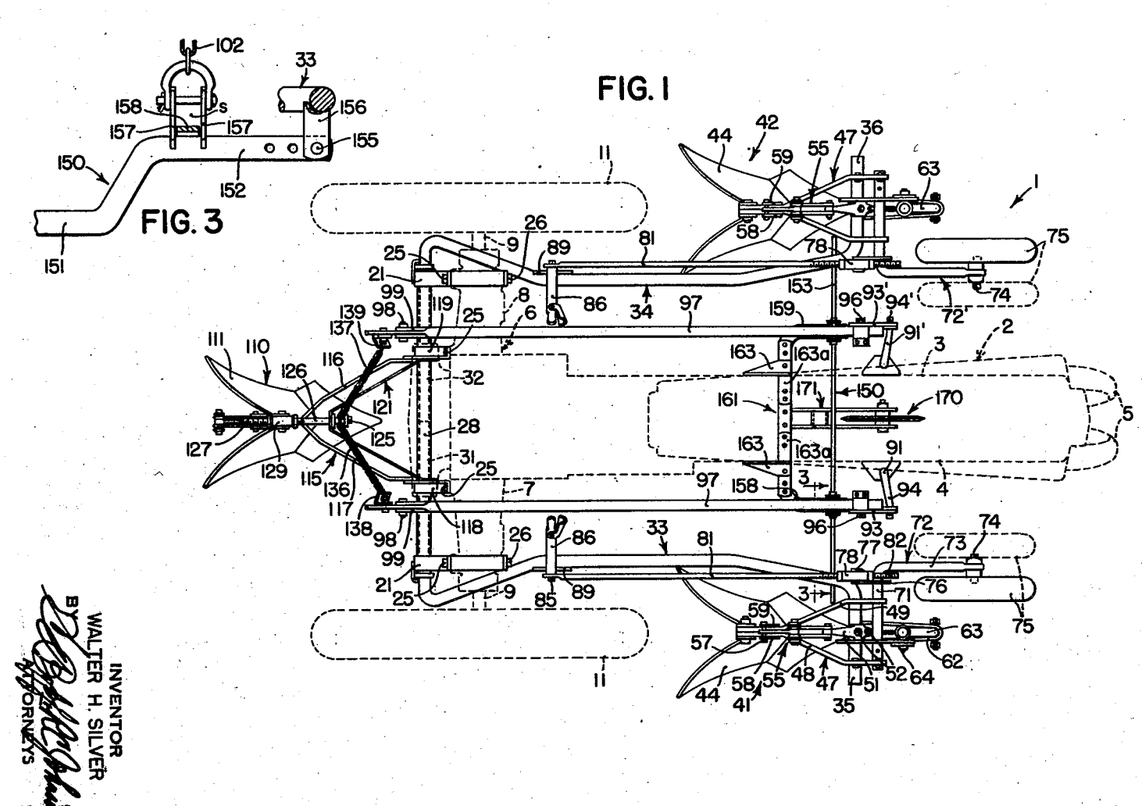
Figure 2:
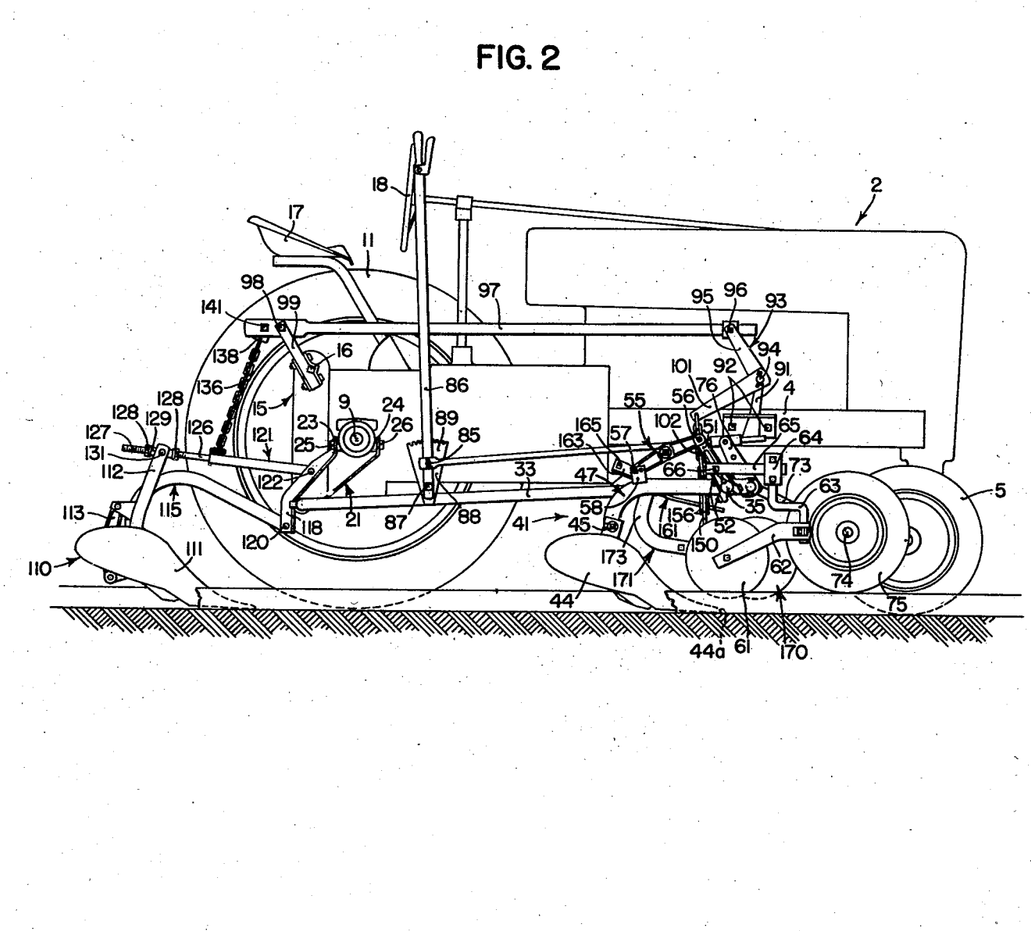
Figure 2 is a side view of one embodiment of the present invention.

Referring now more particularly to Figures 1 and 2, which show one form of the present invention, the implement attachment, indicated in its entirety by the reference numeral 1, is adapted to be mounted on a farm tractor 2 which includes frame means including side bars 3 and 4, front wheel means 5 and a rear axle structure 6 which includes right and left hand quills 7 and 8 in which axle shafts 9 are journaled. Secured to each axle shaft 9 is a rear traction wheel 11. As best shown in Figure 2, the tractor 2 also includes a power lift unit 15 having a power lift rockshaft 16, an operator's seat 17 and a steering wheel 18.

The implement attachment 1, with which the present invention is more particularly concerned, will now be described. Secured adjacent the laterally outer end of each of the rear axle quills 7 and 8 is a depending bracket 21. Each bracket 21 is made up of a strap member bent into a loop formation, and having ends 23 and 24 apertured to receive attaching bolts 25 and 26 by which each bracket is rigidly secured to the tractor, with the lower end extending downwardly and generally rearwardly, as best shown in Figure 2. The two brackets 21 receive, and preferably are rigidly secured as by welding to, a transverse pipe member 28 extending across the machine underneath and rearwardly of the rear axle structure 6. The ends of the pipe member 28 are open and receive the laterally inwardly directed ends 31 and 32 of separately swingable right and left hand push bars or beams 33 and 34. The forward end portion of each of the push bars includes a laterally outwardly directed section, such sections being indicated in Figure 1 by the reference numerals 35 and 36, respectively, and are disposed substantially directly in front of the rear tractor wheels 11 but well toward the front of the machine. A clip 37 (see Figure 4) having a forwardly turned end 38 is welded to the lower end of each bracket 21. The end 38 overlies a set screw collar 39 on the rear end of the associated push bar, 33 or 34 and thereby serves to hold the collar 39 up against the end of the draft pipe 28, whereby inward or outward displacement of the push bar is prevented. The position of the push bars may be changed by loosening the collars 39 and shifting the bars inwardly or outwardly.

The push bars 33 and 34 receive a pair of forward tools 41 and 42, respectively. The tools 41 and 42 are substantially identical, except for parts which may be right and left hand, and hence a description of one will suffice. Referring to the right hand tool 41, the same includes a lister bottom 44 connected, as at 45, to the rear downturned end of a short beam 47. As best shown in Figure 1, the beam 47 includes a pair of right and left hand bars 48 and 49 arranged in rearwardly converging relation and spaced apart at their forward ends. The latter are apertured to receive the laterally outturned end 35 of the right hand push bar or beam 33 and the beam 47 may pivot on the end 35 in the event the bottom 44 encounters an obstruction, as will be referred to later. An arm 51 is rigidly attached, as by clamping bolts 52, to the intermediate portion of the push bar end 35 and extends generally upwardly and rearwardly thereof, as best shown in Figure 2. A self-contained toggle release unit 55, preferably like the toggle release unit shown in the U. S. co-pending application of John I. Cantral, Serial No. 391,742, filed May 3, 1941, now United States Patent No. 2,337,026, issued December 21, 1943, to which reference may be had if necessary, is pivoted at 56 to the upper end of the anchoring bracket 51. The other end of the toggle release unit 55 is pivoted, at 57, to a bracket 58 having one or more holes to receive the pivot 57 and welded or otherwise fastened to the beam 47. Preferably, as best shown in Figure 1, the bracket 58 comprises two lugs 59 one welded to each of the beam straps 48 and 49, each having two holes whereby some adjustment may be made of the position in which the toggle unit 55 breaks upwardly in the event of an overload and permits the plow bottom 44 to swing rearwardly and upwardly so as to clear the obstruction or other cause of the overload. It will be noted from Figure 2 that the point 44a of the plow bottom 44 is disposed substantially directly underneath the push bar end 35 on which the plow beam 47 pivots during this action. By virtue of this relationship, there is, therefore, no tendency for the plow bottom to lift the push bar 33 when the toggle breaks and the plow bottom swings upwardly.

A coulter for the plow bottom 44 is indicated by the reference numeral 61 and is carried by a yoke 62 connected for limited lateral swinging movement to the lower end of a coulter shank 63, the upper end of which is clamped, as at 64, to the front end of a coulter supporting bracket 65, the rear end of which is bolted, as at 66, rigidly to the bracket 51. The lateral position of the coulter may be adjusted by swinging the forward portion of the shank 63 toward one side or the other of the tractor after loosening the bolts of the clamp 64.

As best shown in Figure 1, the ends of the beam straps 48 and 49 are extended forward of the push bar section 35 and are apertured to receive the horizontal section 71 of a gauge wheel crank axle 72. The latter includes a forwardly extending section 73 which is apertured to receive a stud or shaft 74 upon which a gauge wheel 75 is journaled for rotation. The stud 74 is adapted to be secured in either of two positions, one of which is shown in full lines in Figure 1 while the other is shown in dotted lines, one being reversed with respect to the forwardly extending crank axle section 73 relative to the other. It will be noted that in the full line position the gauge wheel 75 is almost directly in front of the lister bottom 44 while in the dotted line position the gauge wheel is disposed well to one side of the lister bottom. An arm 76 is welded at its lower end to the gauge wheel crank axle 72 and at its upper end is apertured and provided with an apertured hammer strap 77 so as to receive a bushing 78 trunnioned in the upper end of the arm 76 and the hammer strap 77. A round bar 81 having a forward threaded end 82 is received in the bushing 78 and carries lock nuts 83, one on each side of the bushing 78, whereby the position of the rod 81 relative to the bushing 78 may be adjusted. The rear end of the rod 81 is flattened and apertured and receives a pivot pin 85 carried by an adjusting lever 86 that, in turn, is pivoted at 87 to a bracket 88 welded or otherwise fixed to the rear portion of the push bar or beam 33. The bracket 88 is widened at its upper end to form a sector 89 which is notched to cooperate with a hand-operated detent carried by the lever 86. It will be observed that the hand lever 86 is supported wholly by the associated push bar 33 and that swinging the hand lever in one direction or the other serves to rock the gauge wheel crank axle 72 and raise or lower the gauge wheel 75 relative to the lister bottom 44. It will also be noted that the gauge wheel 75 is spaced an appreciable distance forward of the associated lister bottom. In this way, the gauge wheel has the advantage of an increased leverage in maintaining the lister bottom at a constant depth, which may be adjusted by moving the hand lever 86. As best shown in Figure 2, this hand lever is easily accessible to the operator on the seat 17, yet in attaching and detaching the implement, the hand lever 86 and associated parts are carried by the bar 33 and have no individual attachment to the tractor.

While the hand lever 86 is admirably adapted to adjust the depth of operation by raising or lowering the gauge wheel, for raising the tool into a transport position it is preferable to raise both the lister bottom 44 and the associated coulter and gauge wheel 61 and 75 relative to the ground. To this end a bracket 91 is bolted, as at 92, to the side 4 of the tractor, and the bracket 91 includes a laterally outwardly directed section 94 (Figure 1) on which a bell crank lever 93 is mounted for rocking movement in a generally vertical plane. The bell crank 93 includes an upwardly extending arm 95 which is pivoted, at 96, to the forward end of a lifting pipe 97, the rear end of which is pivoted, as at 98, to a power lift arm 99 bolted to the end of the power lift rockshaft 16, as best shown in Figure 2. The other arm 101 of the bell crank 93 which is connected by a chain 102 with the implement unit 41 by means which will be described in more detail later.

The left hand implement unit 42 is of substantially the same construction as just described and therefore further detailed description is believed to be unnecessary. Parts of the left hand unit that are identical with the parts of the right hand unit are indicated by the same reference numerals, and those which are the same except for being left hand instead of right hand, are indicated by the same reference numeral to which a prime has been added.

The rear tool is indicated in its entirety by the reference numeral 110 and comprises a lister bottom 111, preferably of the same shape as the lister bottoms 44 mentioned above, pivoted to the lower end of a beam standard 112 but held against pivotal movement relative thereto by means of a toggle trip 113 similar to the toggle trips 55 mentioned above. The lower end of the standard 112 is pivoted to the lower rear curved end of a draft beam 115 which includes a pair of forwardly diverging sections 116 and 117 (Figure 1) which at their forward ends are pivoted, respectively, to brackets 118 and 119 the upper ends of which are fastened to the tractor by the attaching studs 25. An upper V-shaped member 121 has its forward ends apertured to receive pivots 122 by which the member 121 is pivoted to the brackets 118 and 119. The rear end of the V-shaped member 121 is apertured to receive a bar 126 that is preferably welded thereto. The rear end of the bar is threaded, as at 127 (Figure 2) and receives a pair of lock nuts 128 disposed on opposite sides of a bushing 129 trunnioned, as at 131, in the upper end of the two sections making up the lister bottom beam standard 112. The forward ends of the lower beam sections 116 and 117 are pivoted at 120 to the lower end of the associated brackets 118 and 119, and the pivot points 120, 122 and 131, together with the pivot point between the lower end of the standard 112 and the beam 115, are so arranged that the two parts 115 and 121 serve generally as parallel links connecting the lister bottom 111 with the rear end of the tractor for generally vertical floating movement. The front end of the bar 126 is extended forwardly, as at 125 (Figure 1), and receives the lower ends of a pair of chains 136 and 137 which at their upper ends are connected by links 138 and 139 to the rear ends of the lift bars 97, the links 138 and 139 being connected to the lift bars 97 by bolts 141 (Figure 2). Thus, whenever the power lift rockshaft 16 is rocked to swing the lift arms 99 forwardly, the front tool units 41 and 42 are lifted by the resulting rocking movement of the bell cranks 93 and at the same time the rear tool unit 110 is lifted through the connection with the rear ends of the lift pipes 97 afforded by the chain 136, 137. The manner in which the bell cranks 93 are connected to raise the front tool units will now be described.

A cross bar or bracing bar 150 extends underneath the front portion of the tractor and, as best shown in Figure 3, includes a lower intermediate section 151 and two end sections 152 and 153. The end sections are apertured to receive pivot bolts 155 which extend through apertured lugs 156 fixed as by welding to the lower side of each of the push bars 33 and 34. A pair of apertured lugs 157 are fixed to each end section 152 and 153 and the lugs of each pair are spaced apart to provide a slot S therebetween. The slots S receive the front ends 158 and 159 of a U-shaped member 161 which is hingedly connected with the tractor for generally vertical swinging movement by means of a pair of struts or arms 163 rigidly fixed to the U-shaped member 161 at their lower ends and pivoted to the tractor at their upper ends by any suitable means, such as pivot bolts 165. The cross brace 150 carries the pair of upwardly extending lugs 157 to which the lower ends of the chains 102 are respectively connected. The chains 102 being connected at their upper ends with the bell cranks 93, rocking movement of the latter, after first taking up the slack in the chains 102, will act through the cross bar 150 to raise both push bars 33 and 34 about their pivotal connection with the rear of the tractor. When in operating position, as shown in Figure 2, the chains 102 are slack so that the front end of either of the push bars may move upwardly or downwardly according to the contour of the ground over which the associated gauge wheels 75 pass, such independence of movement being accommodated by the fact that the push bars are pivoted in the rear transverse pipe 32 for independent or separate swinging movement. However, the U-shaped member 161 effectively prevents any lateral displacement of the front ends of the push bars at any time. The slots in the members or lugs 157 are of ample length to accommodate the independent movement of the front tools. If desired, the struts 163 may be fastened to the U-shaped member 161 by welding, as mentioned above, or, as shown in Figure 1, plates 163a may be welded or otherwise fixed to the struts 163 and bolted to the U-shaped member 161 in any one of different lateral positions, thereby accommodating the anchoring yoke 161 to tractors having different widths.

The yoke 161 also provides a convenient support for a center coulter. The coulter for the center tool 110 is indicated by the reference numeral 170 in Figure 1 and is mounted for rotation in a standard 171 which, as best shown in Figure 2, comprises a generally L-shaped part having an upper rear section 173 welded or otherwise rigidly attached to the yoke 161. The yoke attaching standard 171 is constructed so as to dispose the coulter 170 in advance of the cross bar 150 in order to prevent interference between these parts when one moves relative to the other, as may occur when traversing uneven ground.

The operation of the implement as so far described is substantially as follows.

When the tools 41, 42 and 110 are in operating position each may move relative to the other and the two push bars 33 and 34 for the front tools may swing vertically independently of one another as guided by the gauge wheels 75 which move faster than the plow bottoms when the push bars swing generally vertically. The depth of operation may be adjusted by changing the position of the hand lever 86, which raises or lowers the associated gauge wheel 75. However, due to the fact that the rear tractor wheels 11 run in the furrows formed by the front tools 41 and 42, a change in the depth of plowing does not effect any material change in the position of the tractor, the only difference being that the front wheels of the tractor may ride somewhat higher when listing deep than when listing shallow. The rear plow bottom 110 is held against lateral swinging relative to the tractor by the spaced apart pivot connections of the upper and lower link members 115 and 121. Also, the plow bottom is held against downward movement by the chains 136, 137. Thus, for the rear tool unit, the rear end of the tractor serves as a depth gauge, but since the rear wheels of the tractor run in the furrows formed by the front tools 41, 42, in effect the rear tractor wheels serve as means running along the bottoms of the furrows formed by the front tools for gauging the depth of operation of the rear tools, the depth of operation of which is, of course, the same as the depth of operation of the front tools. The clockwise rocking movement (Figure 2) of the power lift rockshaft 16 of the tractor serves to raise the front ends of the push bars 33, 34 and the front and rear tools simultaneously. Changing the positions of the depth adjusting levers 86 will raise or lower the gauge wheels 75 relative to the associated lister bottoms and therefore serves to change the depth of operation. Since, as just mentioned, the rear tool 110 is gauged from the bottoms of the furrows formed by the front tools, the hand levers 86 therefore serve also as means for adjusting the operating depth of the rear tool as well as the front tool. In view of the fact that the rear tool 110 is coupled closely behind the rear axle of the tractor, slight changes in the position of the latter will have no material effect upon the position of the rear tool.

If desired, the gauge wheels 75 may be arranged to caster, and thus facilitate steering the tractor while in operation, but generally such a construction is not believed to be necessary since the gauge wheels are raised out of contact with the ground when the tools are raised, and it is only at this time that there is any need for turning the tractor sharply.

Figure 4:
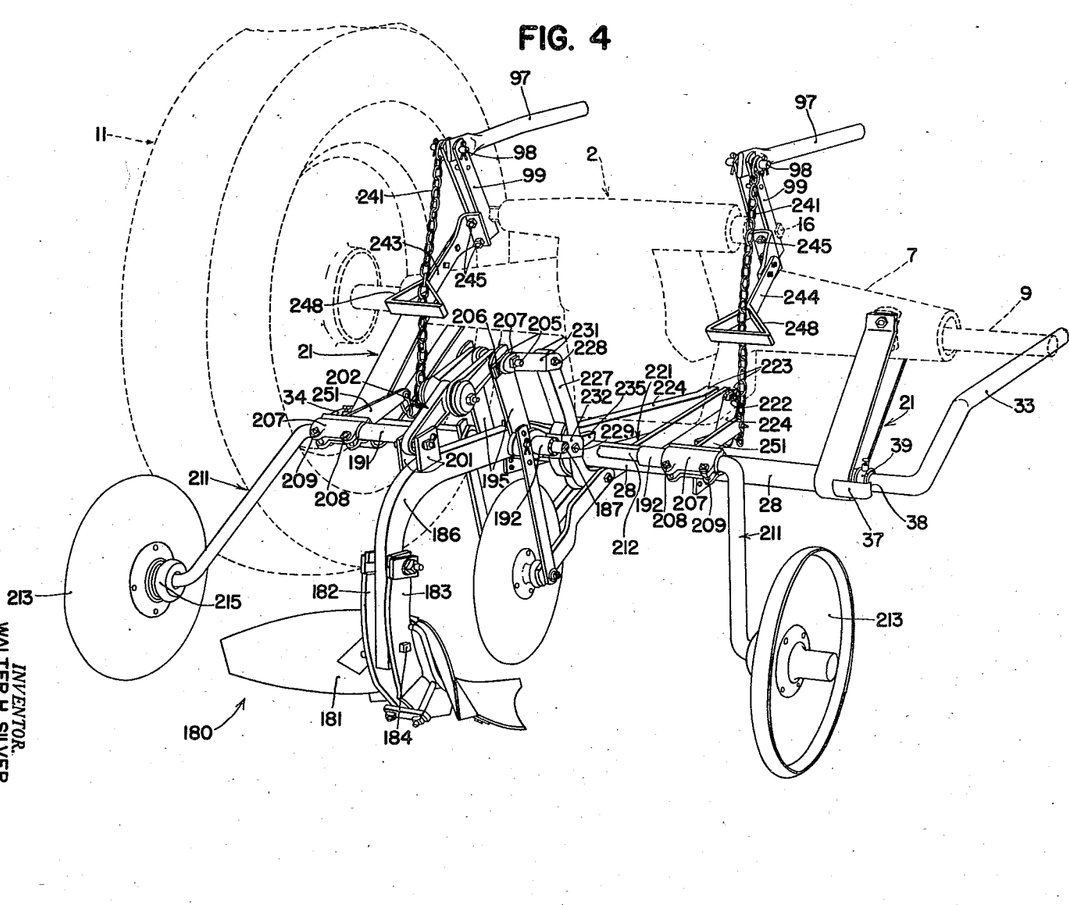
Figure 4 is a perspective view of another embodiment of the present invention.

A modified form of the present invention so far as the rear tool is concerned is shown in Figure 4 in which the rear tool unit, instead of being gauged for depth by the tractor is provided with separate gauge means but which, like the form of the invention shown in Figures 1-2, also utilizes the bottoms of the furrows formed by the front tools for gauging the depth of operation of the rear tool. Referring now to Figure 4, the front tool units and their manner of support and lifting are the same as shown in Figures 1 and 2 and described above, but the rear tool is of slightly different construction. The rear tool unit shown in Fig. 4 is indicated in its entirety by the reference numeral 180 and comprises a furrow opener, plow beam and toggle release which are substantially the same as the units 41 and 42 described above. In the instant form of the invention the rear furrow opener 181 is mounted on a pair of side plates 182 and 183 which are pivoted, as at 184, to the lower end of the downturned portion of the plow beam 186. The forward portion of the beam 186 is apertured to receive a transverse shaft 187 which preferably is welded or otherwise rigidly fixed to the beam 186. A pair of sleeve members 191 and 192 are mounted on the shaft 187 at opposite sides of the beam 186, and at their inner ends each of the sleeves 191 and 192 is welded to an upwardly and rearwardly extending arm member 195. A pair of apertured lugs 201 are fixed to the beam 186 and receive one end of a toggle release unit 202, which preferably is identical with the toggle release units 55 described above. The forward end of the toggle release unit 202 is pivotally connected by a bolt 205 with the upper ends of the arms 195, and pairs of serrated washers 206, 207 provide for a finer adjustment of the position of the beam relative to the arms 195 than is provided by the apertured lugs 201. At the outer end of each of the sleeve members 191 and 192 is a clamp casting 204 which is provided with a pair of clamping bolts 208 and 209. The clamping bolt 208 is adapted, in connection with a key (not shown), to fix the clamp casting 204 to the associated sleeve member. A pair of gauge wheel crank axles 211 are provided, one for each of the sleeve members, and each of the gauge wheel crank axles includes a laterally inturned end 212 received within the outer end of the associated sleeve. The clamping bolt 209, together with a key (not shown), is adapted for holding the crank axle 211 in fixed relation with respect to the associated sleeve. The downward and rearward end of each of the crank axles 211 is turned outwardly to provide an axle upon which a gauge wheel 213 is journaled by any suitable bearing means 215. The two gauge wheels 213 are spaced apart so as to be disposed substantially directly rearwardly of the rear tractor wheels 11. The gauge wheels 213 are dished so that they tend to stay in the bottoms of the furrows opened by the front tools 41 and 42 and traversed by the rear tractor wheels 11.

The rear tool unit 180 shown in Figure 4 is, unlike the tool unit shown in Figure 1, mounted for lateral swinging movement relative to the tractor. This is desirable since the plow bottom 181 is disposed somewhat rearwardly of the position of the plow bottom 111 shown in Figure 2. To this end a generally rearwardly extending draft bar 221 is loosely connected at its front end by a bolt 222 to the forward ends 223 of a pair of angles 224 which form the drawbar support of the tractor. The connection between the front end of the draft bar 221 and the forward ends of the angles 224 is such as to provide a limited amount of lateral swinging movement. The rear end of the draft bar 221 is bent upwardly and rearwardly, as indicated at 227 and is provided with upper and lower apertures to receive bolts 228 and 229 by which the front ends of two pairs 231 and 232 of links are pivotally connected to the bar 221. The rear ends of the links 231 are received by the upper bolt 205, and the rear ends of the lower links 232 are mounted for rocking movement on the laterally inner ends of the sleeves 191 and 192. The links 231 and 232 extend in substantial parallelism, and the draft bar 221 is provided with a lug 235 which fits over the push bar receiving pipe 28. The main body of the bar 221 passes just underneath the pipe 28, and therefore the draft bar 221, while permitted to have a limited amount of lateral swinging, is held against vertical displacement. However, the parallel links 231 and 232 accommodate any vertical movement of the plow bottom 181 but act to keep the same in the angular position determined by the adjustments 206, 207 and 201. In the event the bottom 181 encounters an obstruction, the toggle 202 breaks upwardly, permitting the beam 186 to pivot in a rearward and upward direction about its support through the shaft 187 in the sleeves 191 and 192. Since the gauge wheels 213 are fixed rigidly to the plow beam 186, except of course when the toggle 202 yields, the depth of operation of the plow bottom 181 is determined from the bottoms of the furrows opened by the front tools and which are traversed by the rear tractor wheels. When the tractor is turned, as when passing around a curve on contoured land, the gauge wheels 213 running along the furrow bottoms keep the plow bottom 181 spaced substantially centrally therebetween, notwithstanding the fact that the plow bottom 181 is an appreciable distance back of the rear tractor wheels. If the plow bottom 181 were attached rigidly to the tractor, as the tractor turned in one direction the plow bottom would be shifted laterally in the other direction and therefore open a furrow closer to one of the front furrows than to the other. This disadvantage is obviated in the instant construction by the ability of the rear tool unit to swing laterally. It will also be noted that the point of the furrow opener 181 is substantially underneath the axis defined by the shaft 187, and hence when the toggle 202 yields and the plow bottom swings backwardly, there is no tendency for the gauge wheels and other associated parts to be momentarily lifted. Another advantage of the instant construction so far as the plow beam is concerned is that the rear furrow opener and plow beam are identical with the front furrow opener and beam.

The rear tool unit is raised with the front tool units in the following manner. A pair of chains 241 are connected at their upper ends to the pivots 98 connecting the rear ends of the lift pipes with the power lift arms 99. Auxiliary arms 243 and 244 are secured by the clamping bolts 245 of the power lift arms and each of the auxiliary arms at its rear end is formed with a closed V-shaped section 248 through which the chains 241 extend. At its lower end each of the chains 241 is connected with a forwardly extending arm 251 which at its rear end is connected to or forms a part of the associated clamp casting 207. Normally, the chains 241 are slack when the lister bottom 181 is in operating position and at the same time the auxiliary arms 243 and 244 are disposed so that the chains pass downwardly through the wider portions of the openings at the rear ends of the arms 243 and 244. However, when the power lift is actuated to rock the shaft 16 and swing the power lift arms 99 forwardly, the chains seat in the V-shaped portions of the auxiliary arms whereby, when the rear tool is lifted it is restrained against any further lateral swinging.

Figure 5:
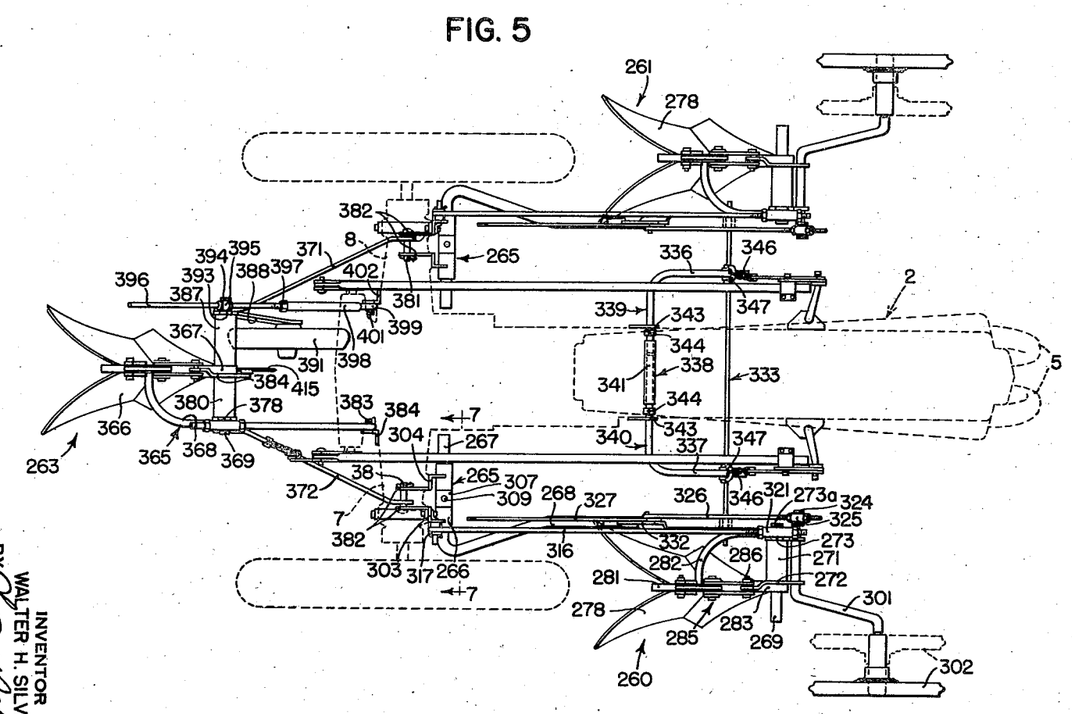
Figure 5 is a plan view of a third form of the present invention.

Another form of the present invention is shown in Figures 5 et seq. Referring now to these figures, the tractor, being of the same construction as described above, is represented by the same reference numeral 2. The implement attachment in this form of the invention incorporates right and left hand units 260 and 261 and a rear unit 263. The right and left hand units 260 and 261 are substantially identical, except that certain parts are right hand while others are left hand, and therefore a description of one unit will suffice. A bracket 265 is secured to the right hand rear axle section 7 and includes a lower sleeve section 266 which receives the laterally inturned end 267 of the right hand push bar 268. The forward portion of the latter includes a laterally outwardly turned end 269 on which a sleeve member 271 is mounted. An upwardly extending arm 272 is secured, as by welding, to the laterally outer end of the sleeve 271 and a second arm 273 is secured, as by welding, to the inner end of the sleeve 271, the arm 273 also extending generally upwardly. A lister bottom 278 is secured by plates 279 to the lower end of a curved generally rearwardly extending beam 281. The beam 281 includes a bifurcated structure having laterally inner and outer arms 282 and 283 apertured to receive the laterally outturned end 269 of the push bar 268 with the sleeve 271 therebetween. A toggle release member 285 is pivoted at its forward end, as at 286, to the upper end of the arm 272, and at its rear end the toggle release coupling 285 is pivoted, as at 287, to bracket lugs 288 carried by the beam 281. An arm 289 is fixed to the arm 272 and extends generally horizontally forwardly to receive a coulter indicated in its entirety by the reference numeral 290, the coulter being of substantially the same construction as described above, except that the coulter yoke 292 comprises side bars 293 bolted or riveted to a casting 294 which is rockably mounted on the lower end of a coulter supporting shank 295 which is secured by a clamp 296 to the arm 289.

The arms 272 and 273 which are fixed to the sleeve 271 have forward extensions which are apertured to receive a gauge wheel crank axle 301 upon the lower end of which a gauge wheel 302 is mounted. Each of the wheels 302 includes a reversible hub 203, and by reversing the wheels, as indicated in dotted lines in Figure 5, the wheels may be disposed either in a laterally inner or a laterally outer position.

Each of the brackets 265 at the rear of the tractor is made up of a pair of angles 303 and 304 bolted, as at 305, to the associated rear axle housing 7. The sleeve 266 referred to above consists of two sleeve sections 266a and 266b (Figure 7) which are secured respectively to the lower ends of the angles 303 and 304. These sleeve sections receive the laterally inturned rear end 267 of the push bar 268, referring to the right hand unit 260, and a collar 307 is mounted on the push bar section 267 between the sleeve sections 266a and 266b. The push bar section 267 is provided with a plurality of openings 308 to receive a pin 309 which is adapted to fasten the collar 307 to the rear end 267 of the push bar. By disposing the pin 309 in different holes 308, the lateral position of the associated push bar may be varied.

Figures 6, 7, 8:
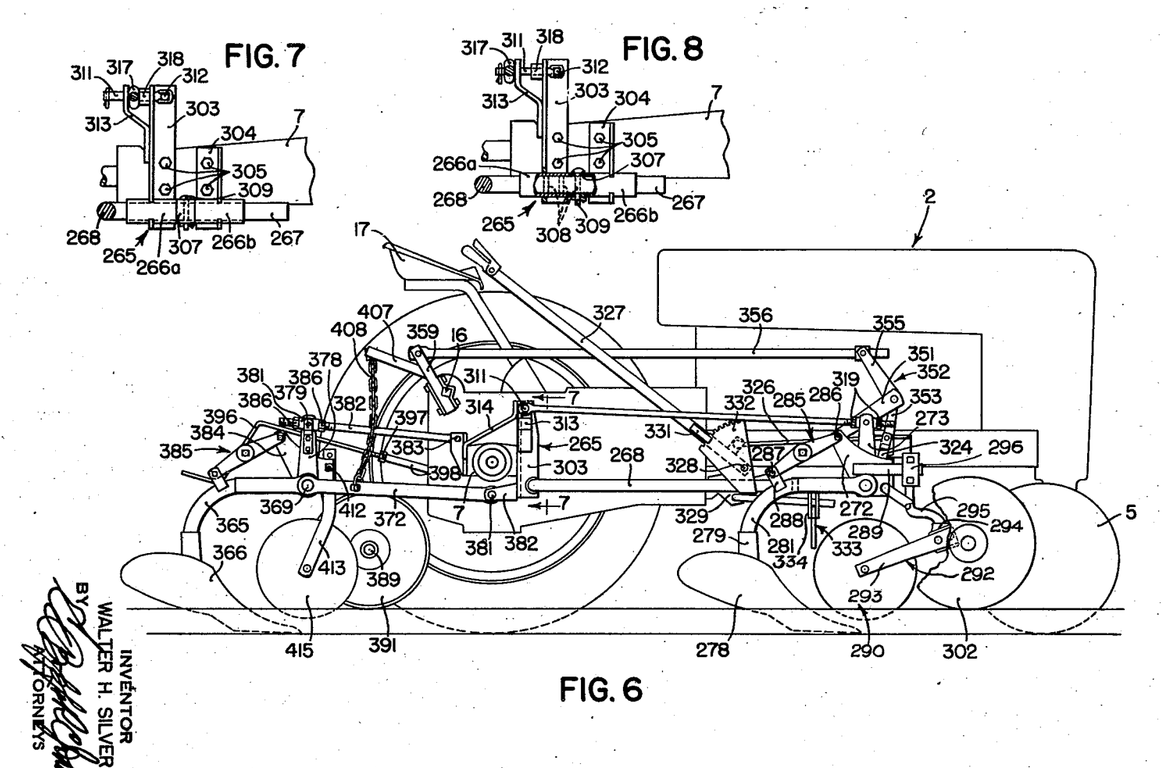
Figure 6 is a side view of the machine shown in Figure 5.
Figure 7 is an enlarged fragmentary view taken along the line 7—7 of Figure 6.
Figure 8 is a view similar to Figure 7, showing the push bar and link in a different lateral setting.
Figure 9:
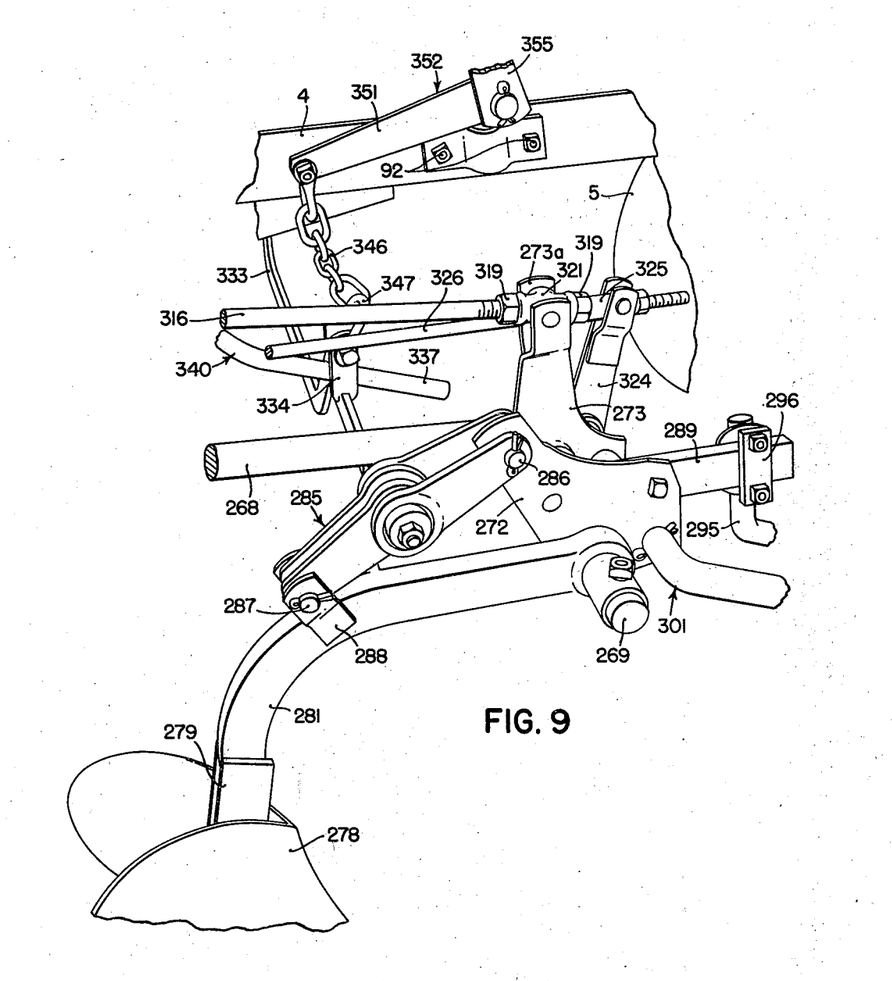
Figures 9 and 10 are perspective views showing at an enlarged scale the front tool supporting means and associated parts.
Figure 10:
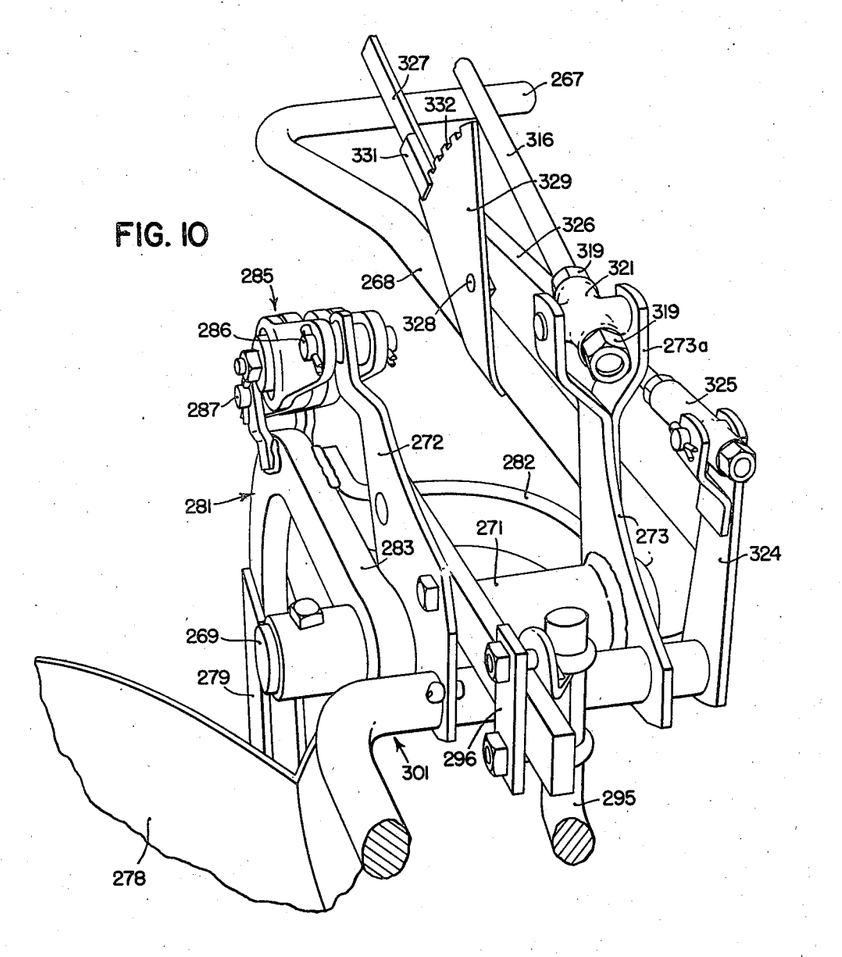

The laterally outer angle 303 is extended upwardly and is apertured to receive a stud 311 which is bolted, as at 312, to the angle 303, with the main portion of the stud extending laterally outwardly, as best shown in Figure 7. The hammer strap 313 serves to hold the stud 311 in laterally extended position. The angle 303 is braced by means of a strap 314 bolted at its upper end to the angle 303 by the bolts 302 and extending rearwardly and downwardly and bolted at its lower end to the rear side of the rear axle housing 7, as best shown in Figure 6.

A rod 316 is provided at its rear end with an eye 317 that is disposed on the stud 311 just inside the upper end of the hammer strap 313, being spaced from the outer edge of the flange of the angle 303 by a spacing collar 318, this being the position also shown in Figure 5. The forward end of the rod 316 is threaded and receives a pair of lock nuts 319 which are disposed on opposite sides of a sleeve 321 trunnioned in the upper end of the arm 273 and a hammer strap 273a forming a part thereof. It will be observed, particularly from Figure 6, that the rod 316 constitutes an upper or tension link while the lower push bar 268 constitutes a lower or compression link extending generally in parallelism with respect to one another and by virtue of which the plow bottom 278 may swing upwardly or downwardly into generally parallel positions so long as the toggle release connection 285 remains intact. If the bottom 278 should encounter an obstruction, the toggle 285 releases the plow and permits the same to pivot upwardly and rearwardly about the push bar end 269.

The operating position of the bottom 278 is controlled by the gauge wheel 302, and to this end the gauge wheel crank axle 301 is provided with an upwardly extending arm 324 carrying a swivel 325 in which the front end of a rod 326 is received. The rear end of the rod 326 is pivoted to an arm on the lower portion of a hand lever 327 which is pivoted as at 328 to a bracket 329 secured directly to the push bar 268. Swinging the hand lever 327 to one position or the other has the effect of raising or lowering the gauge wheel relative to the bottom 278. The hand lever 327 has the usual detent sector means 331 and 332.

The left hand tool unit 261 is of substantially the same construction and parts that are identical have been indicated by the same reference numerals. The front ends of the two push bars 268 are connected together by a transverse cross brace 333 which is substantially the same as the bar 150 described above. Pairs of upstanding lugs 334 are fixed to the end portions of the cross bar 333 and are spaced apart to receive therebetween, respectively, the ends 336 and 337 of an anchoring yoke member indicated in its entirety by the reference numeral 338. As best shown in Figure 5, the yoke member 338 comprises two relatively swingable parts 339 and 340, one of which includes a pipe member 341 enclosing the other, the two parts being mounted for independent rocking movement in a pair of brackets 343 carried by the tractor. Suitable collars 344 or other means holds the yoke 338 against lateral displacement, and being so held, the yoke 338 therefore retains the cross brace 333 and the front ends of the push bars 268 against lateral displacement relative to the tractor.

At each side of the tractor a chain 346 extends downwardly and at its lower end is connected by a clevis 347 to the associated lugs 334 on the cross bar 333. The upper end of the chain 346 is connected to an arm 351 of a bell crank 352 that is mounted for rocking movement on a bracket 353 carried by the tractor. The bell crank 352 includes an upwardly extending arm 355 which is pivoted to the forward portion of a lift pipe 356, the rear end of which is pivoted to a power lift arm 359 which is connected to be actuated by the power lift shaft 16 of the tractor. The lift construction at the other side of the tractor is the same as just described and is substantially the same, for all practical purposes, as the lift construction for the front tools shown in Figures 1 and 2.

The lister beam and bottom 365 and 366 of the rear unit is substantially identical with the front tools, and like the front tools, the rear tool is connected with a tractor by a generally parallel link structure. The rear beam 365 includes a bifurcated structure 367, 368, the forward ends of which are apertured and pivoted on a cross shaft 369. A pair of lower draft links 371 and 372 receive the cross shaft 369 and extend divergently forward where the apertured ends thereof receive pins 381 carried by bracket lugs 382 which are welded to the lower ends of the bracket angles 303 and 304. An arm 378 is welded to a sleeve 380 rockably disposed on the cross shaft 369 between the beam ends 367, 368 and extends generally upwardly. The upper end of the arm is apertured in transverse alignment with an aperture formed in a hammer strap 379. A sleeve member or swivel 381 is pivotally supported in the last mentioned apertures and receives the rear threaded end of a generally forwardly extending link 382, the forward end of which is pivoted, as at 383, to a bracket 384, preferably in the form of an angle, bolted to the rear side of the right rear axle housing 7, as best shown in Figure 5. Lock nuts 386 serve to secure the swivelled member 381 in different positions of adjustment longitudinally of the upper link 382. It will be seen from Figure 6 that the upper link 382 is generally parallel with respect to the lower pair of draft links 371, 372 whereby the tool 366 may move generally vertically relative to the tractor without materially changing the angle of suck. For all practical purposes, the arm 378 and associated parts are of substantially the same construction as the forward arm 273, forming a part of the front unit.

A second arm 384 is fixed to the left end of the sleeve 380 and receives a toggle release connection 385 which is pivotally connected between the arm 384 and the rear portion of the beam 365 in substantially the same manner as the toggle release connections 285 are mounted. A second sleeve 387 is rockably disposed on the left end of the cross shaft 369, between the beam section 367 and the left draft link 371, and welded to the left end of the sleeve 387 is a generally forwardly and downwardly extending arm 388 to the front end of which a stub shaft 389 is fixed. A gauge wheel 391 is journaled on the stub shaft 389. Also fixed to the left end of the sleeve 387 is an upwardly extending arm 393 having a hammer strap 394. The arm and hammer strap are apertured to receive a swivel 395 which is pivoted in the arm 393 and hammer strap 394. The swivel 395 is disposed about the rear end of an adjusting crank screw 396 having collars disposed on opposite sides of the swivel 395, whereby the crank screw 396 is held against fore and aft movement relative to the arm 393. The forward end of the crank screw 396 is threaded into a nut member 397 which forms a part of a sleeve member 398 having at its front end an eye 399 pivoted to a pin 401 carried by a bracket 402 that is fixed to the rear side of the left rear axle housing 8. Turning the crank 396 in one direction or the other adjusts the position of the gauge wheel 391 relative to the lister bottom 366. The amount of movement of the gauge wheel 391 relative to the lister bottom 366 when the latter floats in a generally vertical direction relative to the tractor is negligible, but the particular disposition of the crank 396 causes the gauge wheel 391 to swing rearwardly a small amount when the rear tool is raised, whereby there is no interference between the gauge wheel and the rear end of the tractor.

An extension arm 407 is carried by the right hand power lift arm 359 and is connected by a chain 408 with the draft link 372, whereby operation of the tractor power lift shaft 16 serves to raise not only the front tools but also the rear tool. The chains 346 and 398 are normally slack when operating so as to accommodate the vertical floating movement of the front and rear tools relative to the tractor, but the amount of slack in the rear chain 408 is appreciably greater than the amount of slack in the front chains 346. It will also be noted that the arm 407 (Figure 6) is of appreciable length. This is for the following purpose. Since the rear lister bottom 366 is raised by the same mechanism that raises the front bottoms 278, it is desirable to delay the raising of the rear bottom 366 in order to permit it to run in the soil up to a point approximately where the front bottoms 278 are lifted. Therefore, by having more slack in the chain 408 than in the chains 346, when the tractor power lift is actuated the rear tool 366 does not start to raise for an appreciable length of time after the front tools 278. However, due to the relatively long arm 407, after the chain 408 goes tight, the rear tool 366 is raised relatively more rapid than the front tools 278 so that, in the end, all tools are raised substantially to the same lifted position and at substantially the same time, yet the rear tool 366 works the soil substantially to the point worked by the front tools 278.

While I have shown and described above the preferred structure in which the principles of the present invention have been embodied, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural implement adapted to be connected to a tractor, comprising a pair of laterally spaced apart separately movable push bars, means for pivotally connecting the rear ends of said push bars with said tractor, a tool carried by the front end portion of each of said push bars, one at each side of the tractor, means normally holding said tools against movement relative to said push bars, a cross bar connecting the front end portions of said push bars and adapted to extend transversely of the tractor, and means connecting said cross bar with the tractor so as to act through the cross bar for resisting lateral displacement of either of said tools, said connecting means comprising parts relatively movable only in a generally vertical direction and restrained against relative lateral movement, one of said parts being adapted to be connected to the tractor, and means connecting the other part with said cross bar.

2. An agricultural implement comprising the combination with a tractor of the tricycle type having a single front wheel means and a transverse rear axle with laterally spaced rear wheels, of a pair of laterally spaced apart separately movable push bars pivotally connected at their rear ends with the rear axle of the tractor for generally free vertical movement at their front ends relative to the tractor, a tool connected to the front end portion of each of said push bars, one at each side of the tractor, means for preventing lateral displacement of said front tools, and an intermediate tool disposed substantially behind said front wheel means and also pivotally connected with the rear axle of said tractor and movable relative thereto separately from said push bars.

3. An agricultural implement comprising the combination with a tractor, of a pair of laterally spaced apart separately movable push bars pivotally connected at their rear ends with the rear portion of the tractor for generally free vertical movement at their front ends relative to the tractor, a tool connected to the front end portion of each of said push bars, one at each side of the tractor, means for preventing lateral displacement of said tools, an intermediate tool movably connected with the rear portion of said tractor, a pair of rockable members mounted at the sides of the tractor adjacent the front portions of and connected with said push bars for raising the front ends of the latter, and means mounted adjacent the rear of the tractor and connected with said intermediate tool and said rockable members for raising all of said tools relative to the tractor.

4. A tractor mounted implement comprising a pair of laterally spaced generally longitudinally extending tool-supporting bars, means pivotally connecting said bars with said tractor, a laterally extending bracing bar pivotally connected at its ends with said longitudinal bars, generally vertically shiftable means movably connecting said bracing bar with said tractor for restraining the bracing bar against lateral displacement relative to the tractor, and means on the tractor connected with said bracing bar for raising said tool-supporting bars relative to the tractor.

5. A tractor mounted implement comprising a pair of laterally spaced tool-supporting bars, means at one end of each of said bars for connecting them with said tractor for independent generally vertical movement relative thereto, a transverse brace member pivotally connected at its ends with said tool-supporting bars, a bail hingedly connected with the intermediate portion of the tractor, and means loosely connecting said bail with said transverse bracing member so as to accommodate relatively vertical movement between the bail and said bracing member, for restraining the latter against lateral movement relative to the tractor whereby said tool-supporting bars are also restrained against lateral movement relative to the tractor.

6. An agricultural implement adapted to be mounted on a tractor, comprising a pair of laterally spaced separately movable tool bars, a transverse brace member connected at its ends with said tool bars, a generally U-shaped member, means for hingedly connecting said U-shaped member at its intermediate portion with said tractor for generally vertical swinging movement, and means connecting the ends of said U-shaped member with said brace member so as to restrain the latter against lateral movement relative to said tractor, said connecting means including means loosely connecting the ends of said U-shaped member with the brace member, whereby the latter is capable of moving generally vertically relative to said U-shaped member.

7. An agricultural implement adapted to be connected with a tractor, comprising a pair of laterally spaced tool bars, a transverse brace member connected at its ends with said tool bars, a generally U-shaped member, means for hingedly connecting the intermediate portion of said member with the tractor for generally vertical swinging movement, means connecting the ends of said U-shaped member with said brace member so as to restrain the latter against lateral movement relative to said tractor, and a pair of laterally spaced slotted members fixed to said brace member and receiving, respectively, the ends of said U-shaped member, whereby the latter and said brace member may move vertically relative to one another but lateral displacement of the brace member relative to said U-shaped member and the tractor is restrained.

8. An agricultural implement adapted to be attached to a tractor having laterally spaced rear wheels and a rear axle, said implement comprising a pair of ground working tools, one disposed forward of each of said tractor wheels, a pair of generally horizontally disposed substantially parallel links, one disposed above the other, means pivotally connecting the forward ends of said links with the associated tool, a pair of generally vertically extending laterally spaced brackets fixed to the end portions of said rear axle, a laterally extending sleeve section fixed to the lower end of each of said brackets, means pivotally connecting the rear ends of the upper links with the upper ends, respectively, of said brackets, and means including laterally directed portions connected with the rear ends of the lower links for pivotally connecting the rear ends of said lower links with the laterally directed sleeve sections on said brackets.

9. An agricultural implement adapted to be mounted on a tractor having a rear axle and a rear drive wheel, comprising a generally forwardly extending push bar pivoted at its rear end to the tractor rear axle and carrying a pair of laterally spaced generally vertically disposed brackets at its forward end, a ground engaging tool, means pivotally connected with said laterally spaced brackets for connecting said tool with the front end of said push bar generally forward of the tractor wheel, a ground engaging gauge wheel, and means pivotally connected with said laterally spaced brackets for connecting said gauge wheel with the forward end of said push bar generally forward of said rear wheel and said tool.

10. A tractor mounted implement comprising a push bar adapted to be pivotally connected at its rear end with the tractor and extend forwardly, said push bar having a laterally outturned portion at its forward end, a ground working tool pivotally mounted on the outturned portion at the forward end of said push bar, a bracket member also pivotally mounted on said outturned portion at the forward end of said push bar, adjustable means restraining pivotal movement of said bracket member, and means connecting said ground working tool with said bracket member whereby adjusting the position of the latter adjusts said tool.

11. A tractor mounted implement comprising a push bar adapted to be pivotally connected at its rear end with the tractor and extend forwardly, a ground working tool pivotally connected with the forward end of said push bar, a bracket member pivotally connected with the forward end of said push bar, adjustable means restraining pivotal movement of said bracket member, and means connecting said ground working tool with said bracket member whereby adjusting the position of the latter adjusts said tool, said adjustable means comprising a link member pivotally connected with said bracket member at one end and at the other end with said tractor and extending substantially parallel with respect to said push bar whereby said link and push bar serves to hold said tool in substantially the same angular position irrespective of vertical swinging of said push bar and link relative to the tractor.

12. A tractor mounted implement comprising a push bar adapted to be pivotally connected at its rear end with the tractor and to extend forwardly thereof in a generally horizontal position, said push bar having a laterally outturned end adapted to be disposed generally forwardly of the adjacent tractor rear wheel, a sleeve member rockably mounted on said outturned end of the push bar, a pair of generally upwardly extending arms fixed to said sleeve, a furrow opener adapted to be disposed forward of said tractor rear wheel and including a beam member pivoted on said outturned end of said push bar, an overload trip device pivotally connected at one end with one of said arms and at the other end with said beam member, serving normally to hold the beam member against pivoting movement relative to said sleeve, a forwardly extending bracket fixed to one of said arms, a coulter connected with said bracket forward of said beam member, and means serving as a link member pivotally connected at its forward end with the other of said arms and at its rear end with the tractor, said link member extending generally in parallelism with respect to said push bar whereby vertical swinging of the link member and push bar is accommodated without substantial angular change in the postion of the furrow opener and coulter.

13. The invention set forth in claim 12, further characterized by a gauge wheel crank axle pivotally connected with said sleeve, a gauge wheel carried by said gauge wheel crank axle, and means for adjusting the position of said gauge wheel in a generally vertical direction relative to said furrow opener.

14. A tractor mounted agricultural implement comprising a pair of generally longitudinally extending push bars pivotally connected with the tractor adjacent their rear ends and extending generally forwardly along opposite sides of the tractor, furrow openers connected with the front ends of said push bars, a cross bar connected at its ends with the forward portions of said pushbars, means connecting the cross bar with the tractor to accommodate vertical movement of said push bars but to restrain lateral movement thereof relative to the tractor, and means on the tractor connected with said cross bar for raising both of said push bars into a transport position with the furrow openers out of contact with the ground.

15. A tractor mounted implement adapted to be mounted on a tractor having a rear axle and laterally spaced rear driving wheels, said implement comprising draft brackets fixed to said tractor rear axle, a pair of independently swingable push bars pivotally connected at their rear ends with the lower portions of said draft brackets and each including at its forward end a laterally outturned portion disposed substantially in front of the adjacent rear tractor wheel, a sleeve member pivotally mounted on the outturned portion of each of said push bars, an arm fixed to the inner end of each of said sleeve members, a furrow opener mounted on the laterally outturned end of each of said push bars and connected with the associated sleeve, and a link connection extending from the upper end of said arm rearwardly along the push bars to the upper end of the associated draft bracket.

16. An implement adapted to be attached to a tractor having a rear axle and a pair of laterally spaced rear traction wheels, said implement comprising a pair of furrow openers adapted to be disposed in front of the rear tractor wheels, means connecting each of said front furrow openers with the tractor rear axle and including a pair of generally parallel links accommodating vertical movement of the associated furrow opener relative to the tractor without substantial change in the angular position of the furrow opener, a cross bar pivotally connected at its ends with the forward ends of certain of said forwardly extending parallel links and adapted to be anchored at an intermediate point with the tractor so as to restrain lateral displacement of said front furrow openers, and means on the tractor connected with said cross bar for raising said furrow openers into a transport position.

17. A tractor mounted implement comprising a pair of forwardly disposed laterally spaced ground working tools, means connecting said tools with the tractor, a center rear ground working tool disposed in a position generally midway between said front tools and rearwardly of the tractor, means connecting said rear tool with the tractor for generally lateral movement relative thereto, a pair of gauge wheels spaced apart laterally so as to run in the furrows formed by said front tools, and means for rigidly connecting both of said gauge wheels with said center rear tool for controlling the operating depth of the latter.

18. A tractor mounted bedder comprising a pair of laterally spaced tools carried at the forward portion of the tractor forward of the rear wheels of the latter, a generally centrally disposed rear tool, and a pair of substantially parallel links, one disposed above the other, connecting the central tool with the rear portion of the tractor, the connecting means between the tractor and the front tools including a pair of push bars, each having a laterally outwardly turned end and one of said rear parallel links having a laterally outwardly turned end, said tools being substantially identical and each including a beam member pivoted on the associated laterally outwardly turned end, a sleeve mounted thereon, an overload release between said sleeve and said tool, and means for adjusting the position of said sleeve.

19. An agricultural implement adapted to be attached to a tractor having a rear axle, comprising a pair of push bars disposed alongside the tractor, each of said push bars having a rear laterally turned end, means pivotally connecting the rear ends of said push bars with said rear axle whereby said push bars are mounted for independent movement, tool means pivoted to the forward portions of said push bars, link means connected between said rear axle and said tool means and extending generally parallel with said push bars, ground engaging gauge means movably carried at the forward portion of each of said push bars and disposed in advance of said tool means, and means acting between each push bar and the associated gauge means for adjusting the position of the latter.

20. A tractor mounted bedder comprising a pair of laterally spaced tools, means connecting said tools with the tractor in a position substantially directly in front of the rear wheels of the tractor, whereby the rear wheels of the tractor run in the furrows opened, respectively, by said front tools, a center rear tool, means connecting said center rear tool with the tractor for generally lateral swinging relative thereto, and gauging means for said rear tool including a gauge wheel connected with said rear tool and disposed in a position behind one of said tractor rear wheels so as to run in the furrow traversed by the rear tractor wheel and adapted to be guided by said furrow, particularly when the tractor is turned.

21. A tractor mounted agricultural implement comprising a pair of laterally spaced separately movable push bars, means pivotally connecting the rear end portions of said push bars with the rear portion of the tractor, whereby said bars may have independent movement, each of said bars having a laterally directed section at its front end, a member rockably mounted on the laterally directed portion of each of said bars, tool means carried by the front portions of said push bars and connected with said rockably mounted member whereby the position of the latter controls the position of the associated tool means on each push bar, a gauge wheel carrying member pivotally connected with said rockably mounted member and carrying a gauge wheel disposed generally in advance of the associated tool means, an adjusting means connected between said gauge wheel carrying member and the associated push bar for adjusting the position of the gauge wheel relative to said tool means, and link means connecting each rockably mounted member with the associated rear portion of the tractor, said link means extending generally in parallel relation with respect to the associated push bar.

22. A tractor mounted implement comprising a push bar adapted to be pivotally connected at its rear end with the tractor and to extend forwardly thereof in a generally horizontal position, said push bar having a laterally outturned end adapted to be disposed generally forwardly of the adjacent tractor rear wheel, a sleeve member rockably mounted on said outturned end of the push bar, a pair of generally upwardly extending arms fixed to said sleeve, a furrow opener adapted to be disposed forward of said tractor rear wheel and including a beam member pivoted on said outturned end of said push bar, an overload trip device pivotally connected at one end with one of said arms and at the other end with said beam member, serving normally to hold the latter against pivoting movement relative to said sleeve, and means serving as a link member pivotally connected at its forward end with the other of said arms and at its rear end with the tractor.

23. An agricultural implement comprising a combination with a tractor of the tricycle type having a single front wheel means and a transverse rear axle with laterally spaced rear wheels, and a power lift unit disposed substantially above said rear axle and including upwardly and forwardly swinging arm means, of a pair of laterally spaced apart separately movable push bars pivotally connected at their rear ends with the rear axle of a tractor for generally free vertical movement at their front ends relative to the tractor, a tool connected to the front end portion of each of said push bars, one at each side of the tractor, means for preventing lateral displacement of said front tools relative to the tractor, a rear center tool disposed substantially behind said front wheel means and also pivotally connected with the rear axle portion of said tractor and movable relative thereto separately from said push bars, bell crank means pivotally connected to each side of the tractor, means connecting one arm of each of said bell crank means with said push bars for raising and lowering the tools connected thereto, means connecting the other arm of each of said bell cranks with said tractor power lift, and means also connecting the latter with said rear central tool.

WALTER H. SILVER.

REFERENCES CITED

The following references are of record in the file of this patent:

UNITED STATES PATENTS

| Number | Name | Date |
|---|---|---|
| 2,337,026 | Cantral | Dec. 21, 1943 |
| 540,251 | Hamachek | June 4, 1895 |
| 2,050,424 | Davis | Aug. 11, 1936 |
| 2,092,609 | Morkovski | Sept. 7, 1937 |
| 2,321,464 | Cook | June 8, 1943 |
| 2,332,720 | Hipple | Oct. 26, 1943 |
| Re. 21,667 | Brown et al. | Dec. 24, 1940 |
| 2,200,777 | Lindgren | May 14, 1940 |
| 1,682,228 | Jones | Aug. 28, 1928 |
| 2,173,158 | Corbett | Sept. 19, 1939 |
| 2,187,072 | LeBleu | Jan. 16, 1940 |
| 2,322,115 | Cox et al. | June 15, 1943 |
| 1,827,237 | Jones | Oct. 13, 1931 |
| 2,325,887 | Smith | Aug. 3, 1943 |
| 2,305,254 | Hirschkorn | Dec. 15, 1942 |
| 632,389 | Wilbur | Sept. 5, 1899 |
| 2,059,676 | Altgelt | Nov. 3, 1936 |
| 2,325,870 | Mott | Aug. 3, 1943 |
| 2,197,848 | Brown | Apr. 23, 1940 |
| 2,358,539 | Smith | Sept. 19, 1944 |
| 2,232,506 | Acton | Feb. 18, 1941 |
| 2,200,768 | Benjamin et al. | May 14, 1940 |
| 2,172,983 | Morkoski | Sept. 12, 1939 |